United States Patent
D'Souza et al.

(10) Patent No.: US 11,438,459 B2
(45) Date of Patent: Sep. 6, 2022

(54) DYNAMICALLY MODIFYING CALL FLOW MANAGEMENT USING A COMMON DATA MODEL INTERFACE FOR AUTOMATED CALL DISTRIBUTION SYSTEMS

(71) Applicant: Dell Products L.P., Round Rock, TX (US)

(72) Inventors: Nirmala D'Souza, Austin, TX (US); Jitendra K. Shrivastava, Pflugerville, TX (US); Benjamin C. Willis, Round Rock, TX (US); Pierre E. Lafond, Rochester, NY (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 17/126,291

(22) Filed: Dec. 18, 2020

(65) Prior Publication Data
US 2022/0201124 A1   Jun. 23, 2022

(51) Int. Cl.
*H04M 3/523* (2006.01)
*H04M 3/51* (2006.01)

(52) U.S. Cl.
CPC .................. *H04M 3/5232* (2013.01)

(58) Field of Classification Search
None
See application file for complete search history.

(56) References Cited

U.S. PATENT DOCUMENTS

| 5,546,455 A * | 8/1996 | Joyce ................. H04M 3/523 379/279 |
| 7,149,303 B1 | 12/2006 | Laurinavichus |
| 7,295,669 B1 | 11/2007 | Denton et al. |
| 7,936,868 B2 | 5/2011 | Fitzgerald |
| 9,025,756 B1 * | 5/2015 | Graham ............... H04M 7/009 379/266.01 |
| 2002/0181398 A1 * | 12/2002 | Szlam ............... H04M 3/42229 370/230 |
| 2005/0287983 A1 * | 12/2005 | Armanino ........... H04M 3/2218 455/405 |
| 2009/0132936 A1 | 5/2009 | Anderson et al. |

OTHER PUBLICATIONS

Action Corporation, Setting Up Referential Integrity, An Introduction to Referential Integrity Structures, 7 of 7 pages, https://docs.actian.com/psql/psqlv13/index.html#page/advops/refinteg.htm, Dec. 2020.

* cited by examiner

*Primary Examiner* — Harry S Hong
(74) *Attorney, Agent, or Firm* — Ryan, Mason & Lewis, LLP

(57) ABSTRACT

Methods, apparatus, and processor-readable storage media for dynamically modifying call flow management using a common data model interface for automated call distribution systems are provided herein. An example computer-implemented method includes obtaining data from at least one automated call distribution system; processing at least a portion of the obtained data using at least one common data model pertaining to call flow management; configuring at least one relational database using at least a portion of the processed data; and performing at least one automated action related to call flow management associated with the at least one automated call distribution system using the at least one relational database and one or more user interfaces.

20 Claims, 6 Drawing Sheets

DYNAMICALLY MODIFYING CALL FLOW MANAGEMENT USING A COMMON DATA MODEL INTERFACE FOR AUTOMATED CALL DISTRIBUTION SYSTEMS

FIELD

The field relates generally to information processing systems, and more particularly to techniques for processing communication data using such systems.

BACKGROUND

An automated call distribution system, also referred to as an automatic call distributor (ACD), is a set of one or more telephony devices that distribute incoming calls to at least one specific group of call center agents within at least one organization. ACDs typically provide a programmable interface and scripting language that determines how calls are handled and distributed. Programming within an ACD can include, for example, the use of a toll-free number (TFN) pointing to an address on a switch. As a call arrives, a set of logical steps begin executing to determine how the call will be routed. Conventional ACDs, however, commonly include call flow management (CFM) that can only expose a single call flow at a time, which is disadvantageous in contexts wherein there are many call flows involving many agents possessing different skills.

SUMMARY

Illustrative embodiments of the disclosure provide techniques for dynamically modifying call flow management using a common data model (CDM) interface for automated call distribution systems. An exemplary computer-implemented method includes obtaining data from at least one automated call distribution system, processing at least a portion of the obtained data using at least one common data model pertaining to call flow management, and configuring at least one relational database using at least a portion of the processed data. The method also includes performing at least one automated action related to call flow management associated with the at least one automated call distribution system using the at least one relational database and one or more user interfaces.

Illustrative embodiments can provide significant advantages relative to conventional call flow management techniques. For example, problems associated with being capable of only exposing a single call flow at a time are overcome in one or more embodiments through enabling dynamic modification of multiple call flows using a CDM interface and related configured relational database.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
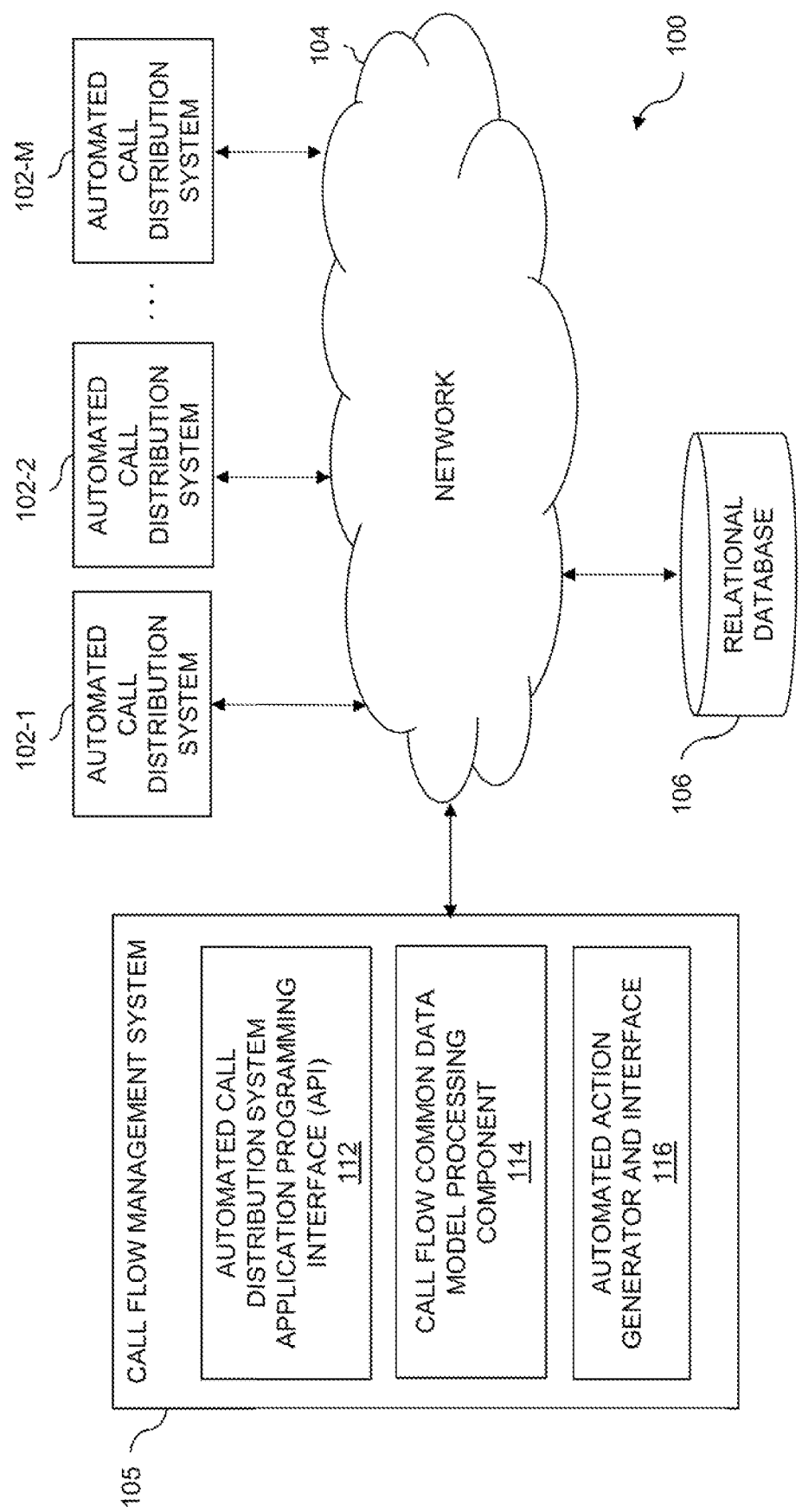
FIG. 1 shows an information processing system configured for dynamically modifying call flow management using a CDM interface for automated call distribution systems in an illustrative embodiment.

FIG. 1 shows a computer network (also referred to herein as an information processing system) 100 configured in accordance with an illustrative embodiment. The computer network 100 comprises a plurality of automated call distribution systems 102-1, 102-2, . . . 102-M, collectively referred to herein as automated call distribution systems 102. The automated call distribution systems 102 are coupled to a network 104, where the network 104 in this embodiment is assumed to represent a sub-network or other related portion of the larger computer network 100. Accordingly, elements 10M and 104 are both referred to herein as examples of "networks" but the latter is assumed to be a component of the former in the context of the FIG. 1 embodiment. Also coupled to network 104 is call flow management system 105 (also referred to herein, in connection with one or more embodiments, as a BREAD component).

The automated call distribution systems 102 include a set of one or more telephony devices which may comprise, for example, mobile telephones, laptop computers, tablet computers, desktop computers or other types of computing devices. Such devices are examples of what are more generally referred to herein as "processing devices." Some of these processing devices are also generally referred to herein as "computers."

One or more of the automated call distribution systems 102 in some embodiments comprise respective telephony devices associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, call flow management system 105 can have an associated relational database 106 configured to store data pertaining to ACDs and call flows related thereto, which comprise, for example, ACD data that have been processed and/or transformed into at least one given CDM format.

The database 106 in the present embodiment is implemented using one or more storage systems associated with call flow management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with call flow management system 105 can be one or more input-output devices, which illustratively comprise keyboards, displays or other types of input-output devices in any combination. Such input-output devices can be used, for example, to support one or more user interfaces (UIs) to call flow management system 105, as well as to support communication between call flow management system 105 and other related systems and devices not explicitly shown.

Additionally, call flow management system 105 in the FIG. 1 embodiment is assumed to be implemented using at least one processing device. Each such processing device generally comprises at least one processor and an associated memory, and implements one or more functional modules for controlling certain features of call flow management system 105.

More particularly, call flow management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows call flow management system 105 to communicate over the network 104 with automated call distribution systems 102, and illustratively comprises one or more conventional transceivers.

The call flow management system 105 further comprises an automated call distribution system API 112, a call flow CDM processing component 114, and an automated action generator and interface 116.

It is to be appreciated that this particular arrangement of modules 112, 114 and 116 illustrated in the call flow management system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

By way of further example, one or more embodiments can include implementing an API (e.g., automated call distribution system API 112 in FIG. 1 or API 212 in FIG. 2) on one or more systems involved and/or utilized in information processing system 100 (e.g., on call flow management system 105 or on one or more automated call distribution systems 102), and/or in a distributed manner across such systems. For instance, in such an example embodiment, each automated call distribution system 102 can expose an API such as automated call distribution system API 112 to external management entities such as call flow management system 105.

As also to be appreciated herein, at least portions of modules 112, 114 and 116 may be implemented at least in part in the form of software that is stored in memory and executed by a processor.

It is to be understood that the particular set of elements shown in FIG. 1 for dynamically modifying call flow management using a CDM interface involving automated call distribution systems 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, call flow management system 105 and relational database 106 can be on and/or part of the same processing platform.

An exemplary process utilizing modules 112, 114 and 116 of an example call flow management system 105 in computer network 100 will be described in more detail with reference to the flow diagram of FIG. 4.

Accordingly, at least one embodiment includes generating and/or implementing a framework to improve and/or optimize call flow managements dynamically using at least one CDM interface for automated call distribution systems. Such an embodiment includes enabling multi-call flow management in real-time based at least in part on a unique CDM, a BREAD component, and a unique UI. Functionalities associated with such an embodiment ensure call flows can be effectively utilized by saving both time and resources, as well as by providing a positive and/or improved user experience.

One or more embodiments include improving and/or optimizing CFM dynamically using a CDM that programmatically transforms unstructured data into third order normal form to prevent data duplication by using primary key-foreign key relationships coupled with cascade referential integrity. In such an embodiment, the CDM serves as the standard taxonomy with entity-relationship classifications between various related components such as, for example, switch, agent, vector, vector directory number (VDN), hunt groups (e.g., skills), announcements, etc. Additionally, the CDM and at least one corresponding UI efficiently facilitate reviewing call flow designs and/or changes for production deployment.

As noted above and further used herein, a primary key refers to a column or a set of columns in a table whose values uniquely identify at least one row in the table. A relational database can be designed to enforce the uniqueness of primary keys, for example, by allowing only one row with a given primary key value in a table. Also, as used herein, a foreign key refers to a column or a set of columns in a table whose values correspond to the value(s) of a primary key in another table. In order to add a row with a given foreign key value, there must exist a row in the related table with the same primary key value.

As additionally used herein, referential integrity requires that a foreign key must have a matching primary key or the foreign key must be null. Such a constraint can be specified between two tables (e.g., a parent table and a child table), and it maintains correspondence between rows in such tables. Additionally, such a constraint indicates that the reference from a row in one table to another table must be valid.

By way merely of an example of a parent-child relationship using primary key-foreign key relationships and cascading referential integrity, assume tables of CM, Vector, and VectorStep within a data model. In such an example, CM and Vector are linked in a primary key (CM.CMId)—foreign key (Vector.CMId) relationship, and in this relationship, CM is considered the parent and Vector is considered the child. There can also be another level of relationship between the Vector and the VectorStep tables in such an example. For instance, Vector and VectorStep are linked in a primary key (Vector.VectorId)—foreign key (VectorStep.VecturId) relationship, and in this relationship, Vector is considered the parent and VectorStep is considered the child.

In at least one embodiment, a UI is generated and/or implemented which is based on the model-view-controller (MVC) design pattern and such a UI provides users with multi-level views drilled down to multiple AC) components and enables one or more modifications to call flows (e.g., in real-time). By planning call flows, one or more such embodiments include triaging users/customers and handling various users/customers appropriately.

As detailed herein, while ACDs share purposes of routing calls, ACDs do not always share the same data structures and/or programming methods. Accordingly, at least one embodiment includes generating and/or providing one or more vendor-agnostic solutions with unique functionalities. In such an embodiment, a component also referred to herein as a BREAD component provides a unique generic interface to expose call flow data from any ACD beginning with an API connection. Through the API's connection to the ACD and subsequent processing, wherein all non-key attributes are dependent on only the primary key and stored into multiple tables, the ACD data are programmatically transformed into a CDM of third order normal form. The CDM enables a common language data description which can be shared, for example, via a web interface, regardless of the ACD from which the data were derived. Through such an interface, the user (e.g., a business or other enterprise entity) can view call flows and change the call flows as needed without the need of technical programmers. Finalized call flows can then be pushed back to their respected ACD and made live.

While ACD vendors typically have their own API, BREAD's functional characteristics not only transform unstructured data to fit into at least one CDM, but also provide at least one CDM interface to be readily accessible via a set of decision support management tools.

Additionally or alternatively, in at least one embodiment, a BREAD application is browser-based and highly customizable, precluding the need for a user to install any software in his or her local machine. Also, in such an embodiment, the user can update entries and/or delete entries (or portions thereof) without needing to know or possess details about the related entities.

Figure 2:
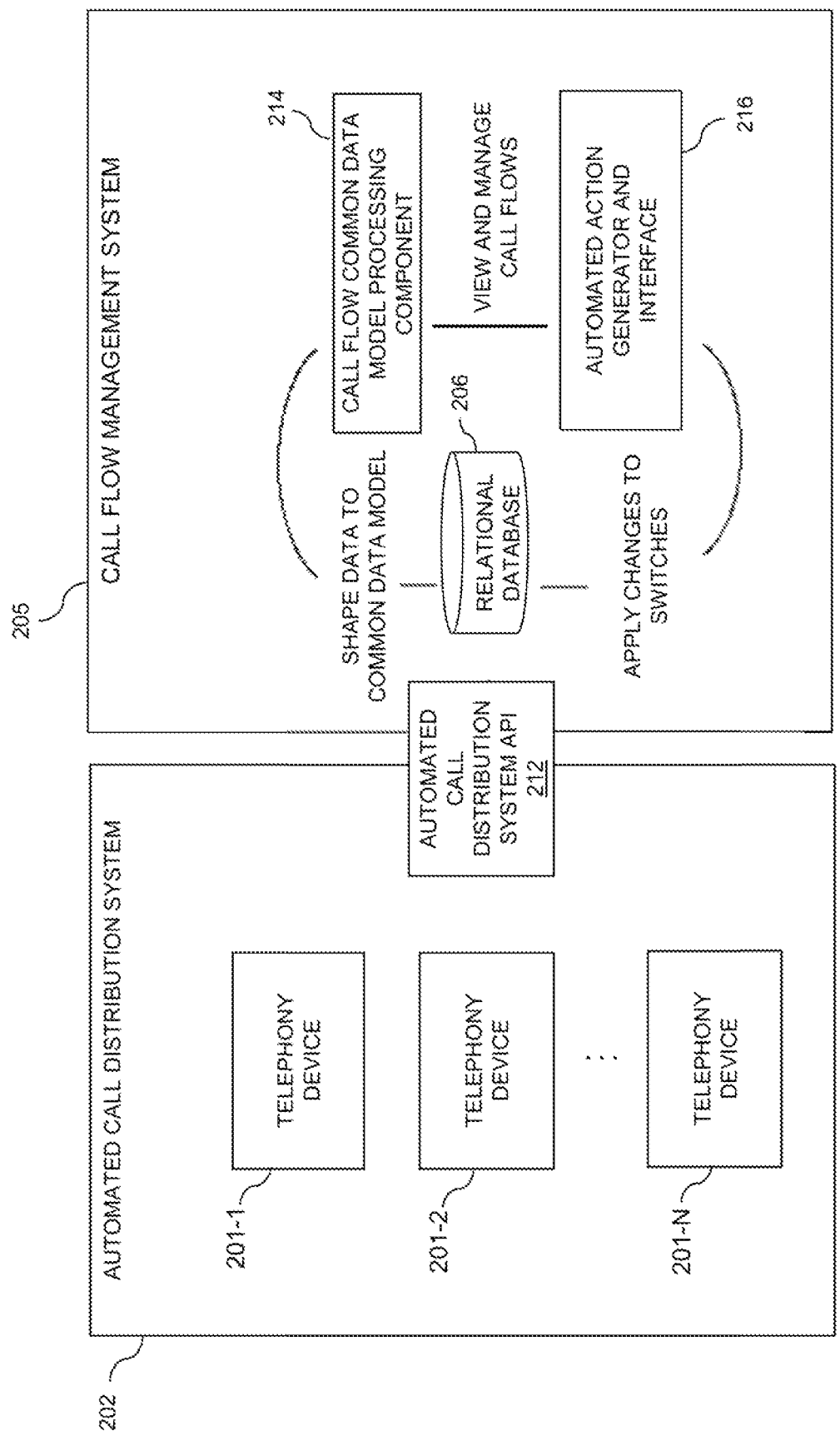
FIG. 2 shows example functional layers of a browse, read, edit, add, and delete (BREAD) component in an illustrative embodiment.

FIG. 2 shows example functional layers of a BREAD component in an illustrative embodiment. By way of illustration. FIG. 2 depicts automated call distribution system API 212, which forms a connection from call flow management system 205 to automated call distribution system 202 (which includes telephony devices 201-1, 202-2, ... 201-N), and processes and/or transforms data from the automated call distribution system 202. Specifically, in at least one embodiment, automated call distribution system API 212 pulls data from automated call distribution system 202, processes and/or shapes at least a portion of the data into at least one CDM, in connection with call flow CDM processing component 214, for viewing, updating and/or modifying, and stores at least a portion of the data in relational database 206. Also, in one or more embodiments, automated call distribution system API 212 can push one or more incremental changes to the automated call distribution system 202 and/or one or more call flows related thereto in connection with interface 216.

Automated action generator and interface 216, in such an embodiment as depicted in FIG. 2, includes a UI which exposes call flows as a relationship of switches, skills, agents, recordings and/or steps. Such a UI allows multi-level views to one or more components of automated call distribution system 202. Additionally, automated action generator and interface 216 can generate at least one graphical rendering of one or more call flows to enable users (e.g., non-technical call center staff) to visually traverse the steps in one or more call flows without needing knowledge of a given scripting interface. Further, automated action generator and interface 216 enables a user to make one or more modifications to one or more call flows in connection with the UI.

As also depicted in FIG. 2, relational database 206 includes a data structure enabling automated call distribution system data to be structured in CDM, accessible by one or more vendor-agnostic APIs.

Figure 3:
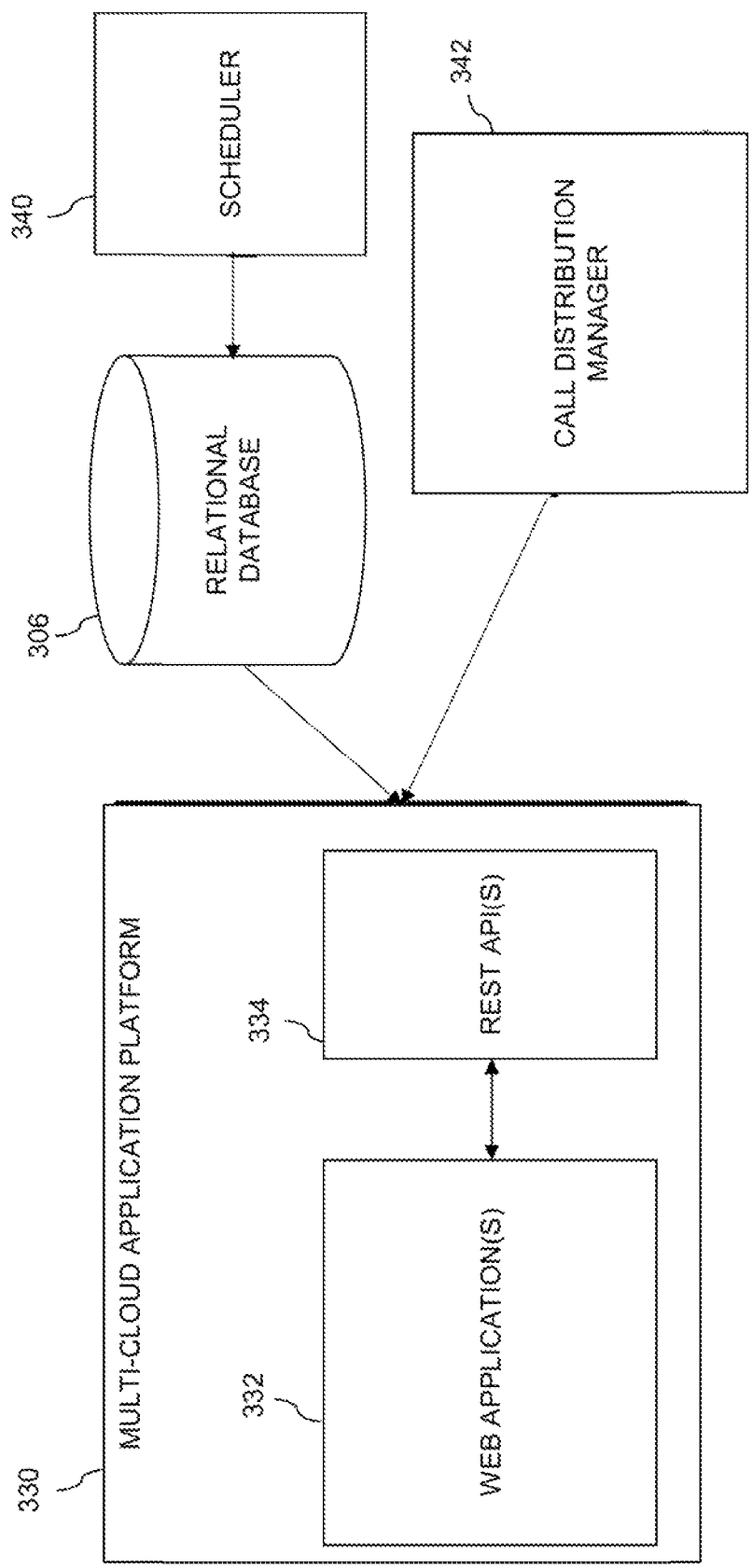
FIG. 3 shows example extensions of a BREAD component in an illustrative embodiment.

FIG. 3 shows example extensions of a BREAD component in an illustrative embodiment. By way of illustration, FIG. 3 depicts a multi-cloud application platform 330, which includes one or more web applications 332 and one or more representational state transfer (REST) APIs 334, and which can carry out one or more functionalities in connection with one or more automated call distribution systems. Such web applications 332 can include, for example, one or more applications developed using hypertext markup language (HTML), cascading style sheets (CSS), Bootstrap. and/or JQuery to provide at least one graphical user interface for ACD data. Also, such REST APIs 334 can include one or more Spring Boot-based rest APIs developed to pull information from relational database 306 for one or more read operations and/or call distribution manager 342 for one or more edit, delete and/or add operations. In at least one embodiment, a framework such as depicted in FIG. 3 can also provide validation and business processing of such information.

In connection with the example embodiment depicted in FIG. 3, relational database 306 is used to store ACD entity information, while call distribution manager 342 includes a source system that manages call distribution and routes calls to agents. Additionally, scheduler 340 is configured to periodically pull information from at least one source system (and provide at least a portion of such information to relational database 306) and maintain one or more audit trails for any information change.

As also detailed herein, one or more embodiments include providing and/or enabling various features such as, for example, global searching, playing announcements, graphical representation of call flows, exporting information, editing information, adding information, deleting information, etc. Global search functionality allows end-users to perform search operations across multiple switches. Global search functionality also includes searching additional records that match different attributes from what a user provides in a form. Playing announcements can include fetching announcement transcripts and playing such transcripts over a browser, and such a functionality can be leveraged by a user to not only check a transcript but also to check a reference of announcement across multiple VDNs.

Also, the functionality of graphical representation of call flows provides an ability to BREAD users to generate call flow steps into at least one graphical flow chart diagram. Such a graphical call flow diagram can, for example, not only show the steps in a call flow but also show dynamic variables that decide the call route, thereby illustrating call flows in an ACD environment for use in managing such call flows. Such a graphical representation of a call flow can also help users who do not have extensive technical knowledge to interact with the ACD tool. In at least one embodiment, the BREAD application allows users to choose different graphical representation formats such as, for example, portable document format (PDF), one or more image formats, HTML, etc., while generating one or more diagrams. Such diagrams can also be exported for purposes of sharing, organizing, collaborating, versioning, etc.

The functionality of exporting information enables BREAD users to export and share any information within an application in different formats such as clipboard, comma-separated values (CSV), PDF, spreadsheet, print, etc. Also, the functionality of editing, adding, and/or deleting information allows users to edit and/or delete one or more existing call flows and add one or more new call flows to at least one ACD system. Such a feature also enables users to perform these operations without knowing or possessing technical details about how the operations will take place in the ACD system internally. Such a feature can also validate operations for human errors, which can include a locking mechanism to avoid data discrepancies and audit trails for versioning.

Additionally, in at least one embodiment, BREAD programmatically builds a CDM from relationship classifications wherein all non-key attributes are dependent on only the primary key and stored into multiple tables. For instance, each of the tables that is related in a given model relate to a CM identifier (CMID) and/or switch identifier as a primary-foreign key constraint. Flowing from the switch component can be one or more other related components that work in relation thereto, such as, for example, an agent, a vector, a VDN, hunt groups (e.g., skills), announcements, etc. Each of these relate back to the switch through the switch identifier (ID) (e.g., CMID).

Also, in such an embodiment, agent tables detail out attributes that are associated with a given agent on the switch, such as, for example, agent skills, extensions, staffing decisions, etc. Vector tables detail out attributes that are associated with a related vector within the switch designation. Such attributes can include, for example, the name, number, and individual steps that are utilized for the given vector. As also detailed herein, in such an embodiment, a VDN, one or more variables, one or more skills, and one or more announcements can all flow with a similar pattern within the framework of a model used in conjunction with BREAD, allowing attributes and details to be used to help expound on the abstraction of an overlying model.

At least one embodiment also includes implementing an ACD BREAD interface to messaging-oriented middleware (MOM). As detailed herein, in one or more embodiments, an ACD is configured to distribute calls to various queues and agents in a manner that increases productivity and responsiveness. Queues are constructed according to specific criteria and/or rules, and are designated to handle call placement and overflow. In such an embodiment, a BREAD interface to MOM is implemented to leverage enterprise MOM infrastructure to transport messages more efficiently and decouple queue structures into at least one logical separate entity which is scalable, resilient, and fault-tolerant as volume increases. Also, such an embodiment can include using a generic API book and implementable interface to at least one MOM service bus agnostic of different vendor technologies.

Accordingly, one or more embodiments include generating and/or implementing a robust, generic and implementable CDM and BREAD interface layer, which can include one or more integrator services to other tools and processes which provide data integration and augmentation capability unavailable with conventional ACD offerings.

Figure 4:
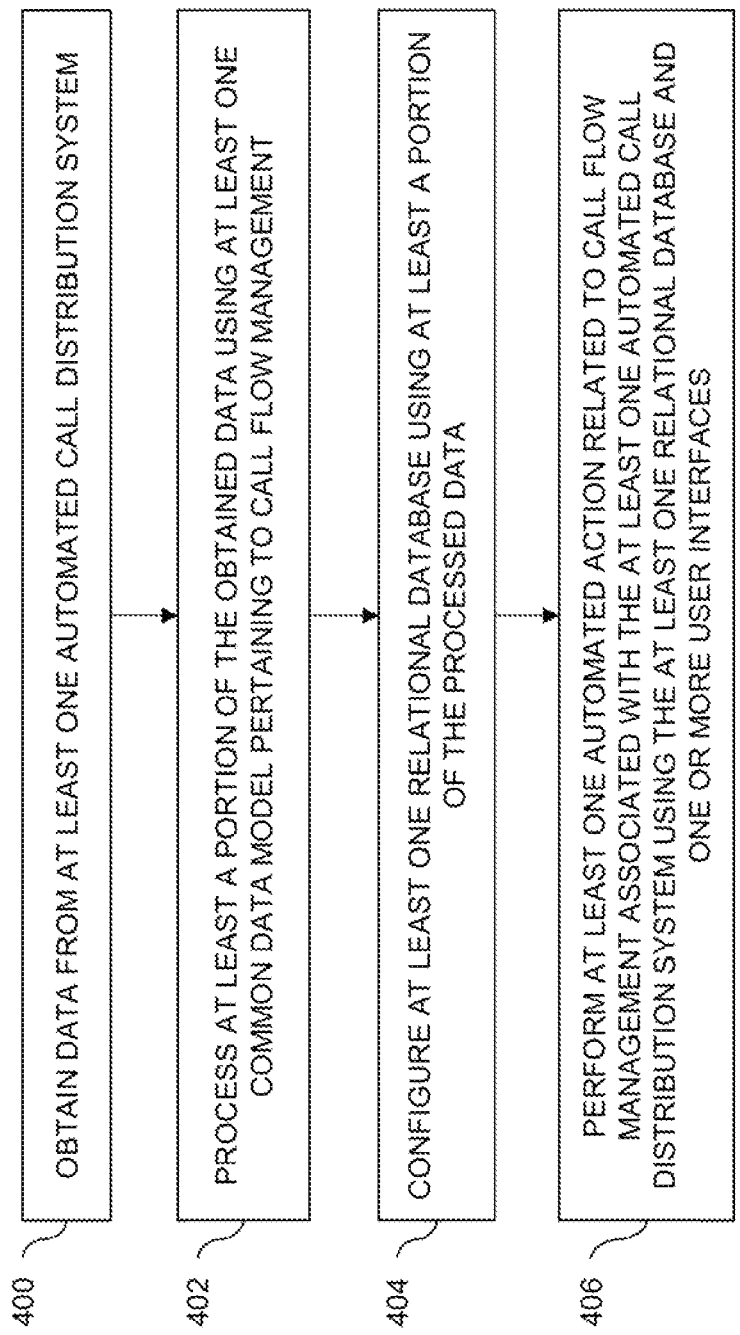
FIG. 4 is a flow diagram of a process for dynamically modifying call flow management using a CDM interface for automated call distribution systems in an illustrative embodiment.

FIG. 4 is a flow diagram of a process for dynamically modifying call flow management using a CDM interface for automated call distribution systems in an illustrative embodiment. It is to be understood that this particular process is only an example, and additional or alternative processes can be carried out in other embodiments.

In this embodiment, the process includes steps 400 through 406. These steps are assumed to be performed by the call flow management system 105 utilizing its modules 112, 114 and 116.

Step 400 includes obtaining data from at least one automated call distribution system. Step 402 includes processing at least a portion of the obtained data using at least one common data model pertaining to call flow management (e.g., static, dynamic and/or real-time call flow management). In one or more embodiments, the at least one common data model includes a standard taxonomy with one or more entity-relationship classifications between components pertaining to call flow management. In such an embodiment, the components pertaining to call flow management can include at least two of one or more switches, one or more agents, one or more vectors, one or more vector directory numbers, one or more hunt groups, one or more agent skills, and one or more announcements.

In at least one embodiment, processing the at least a portion of the obtained data includes programmatically transforming unstructured data obtained from the at least one automated call distribution system into third order normal form data. Additionally or alternatively, processing the at least a portion of the obtained data can include one or more using primary key-foreign key relationships coupled with cascade referential integrity.

Step 404 includes configuring at least one relational database using at least a portion of the processed data. Step 406 includes performing at least one automated action related to call flow management associated with the at least one automated call distribution system using the at least one relational database and one or more user interfaces. In at least one embodiment, performing the at least one automated action includes generating, and outputting to the at least one automated call distribution systems, one or more call flows. Additionally or alternatively, performing the at least one automated action can include enabling at least one user to carry out one or more actions across multiple call flows associated with the at least one automated call distribution system, wherein the one or more actions comprise at least one of a browse operation, a read, an edit operation, an add operation, and a delete operation. Further, in one or more embodiments, the one or more user interfaces include at least one user interface configured based at least in part on a model-view-controller design pattern, and wherein the at least one user interface provides one or more multi-level views encompassing multiple components of the at least one automated call distribution system.

The techniques depicted in FIG. 4 can also include implementing an interface to at least one messaging-oriented middleware associated with the at least one automated call distribution system.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to enable dynamic modification of multiple call flows using a CDM interface and related configured relational database. These and other embodiments can effectively overcome problems associated with being capable of only exposing a single call flow at a time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
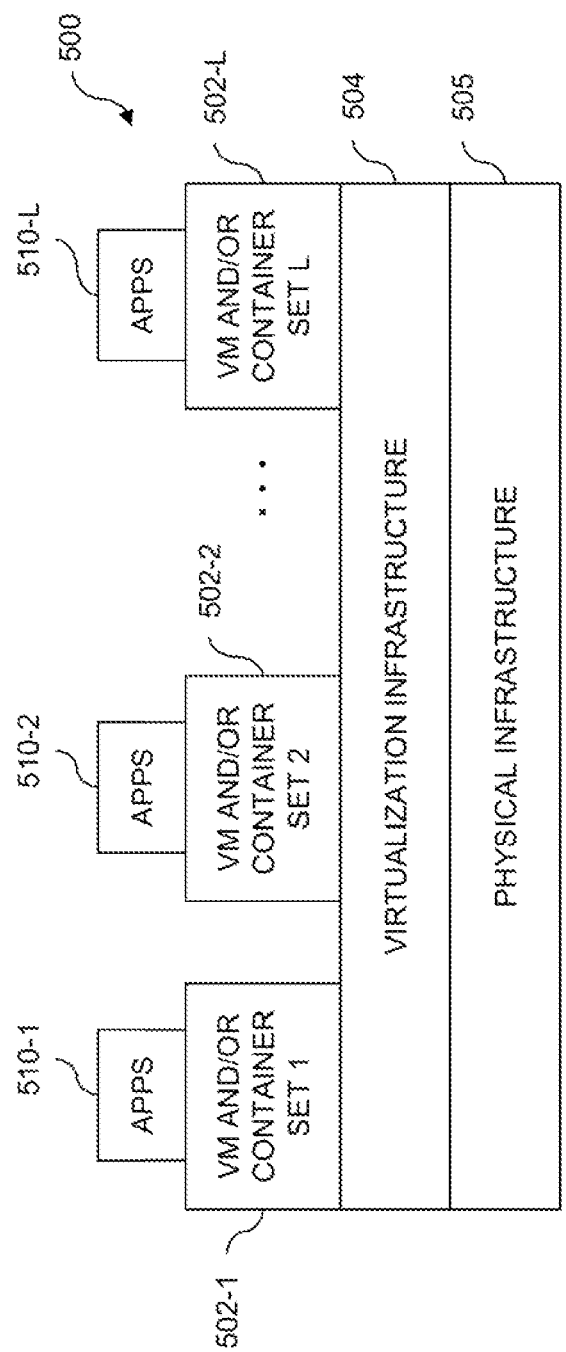
FIGS. 5 and 6 show examples of processing platforms that may be utilized to implement at least a portion of an information processing system in illustrative embodiments.
Figure 6:
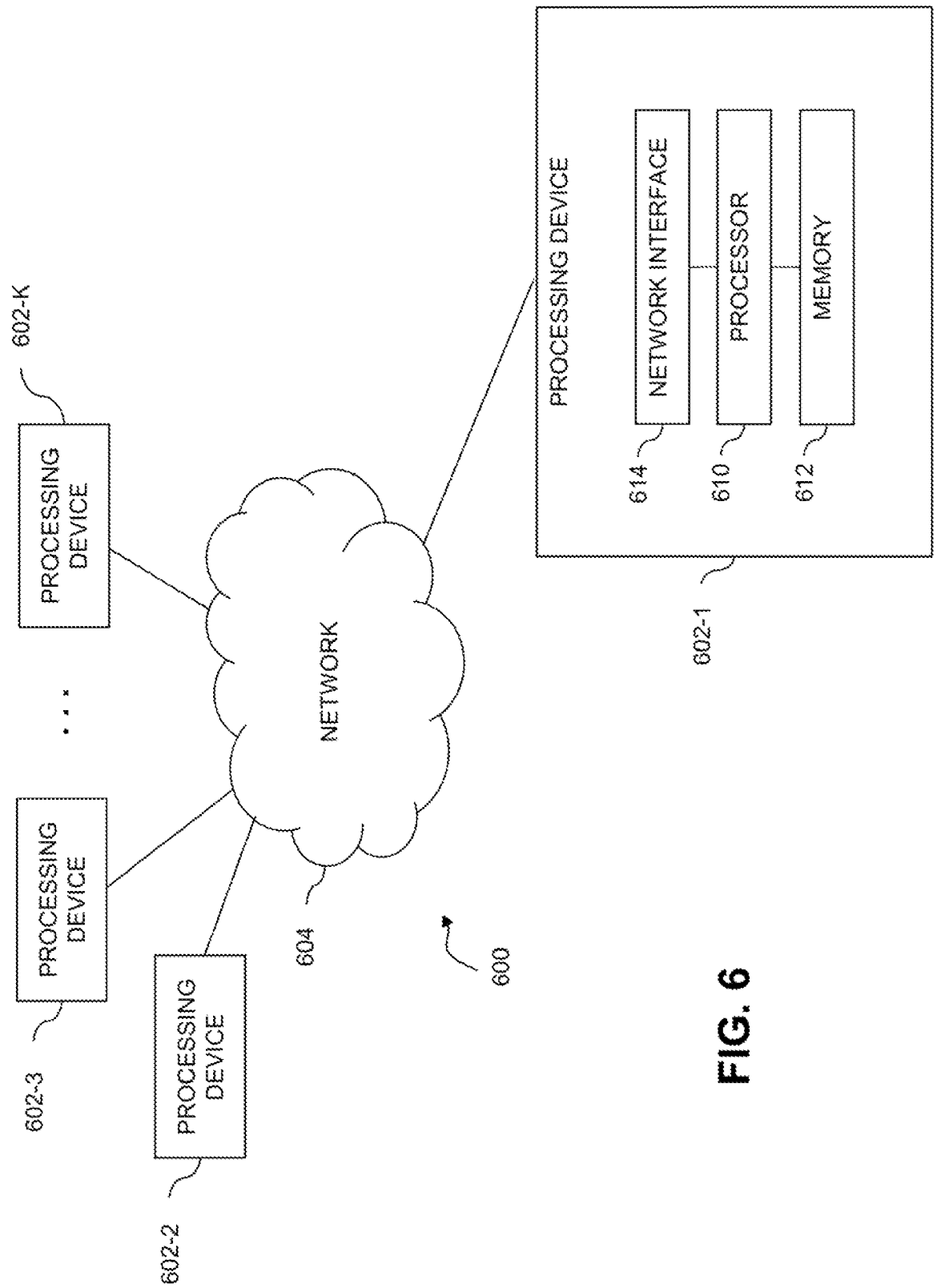

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2 . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining data from at least one automated call distribution system;
processing at least a portion of the obtained data using at least one common data model pertaining to call flow management;
configuring at least one relational database using at least a portion of the processed data; and performing at least one automated action related to call flow management associated with the at least one automated call distribution system using the at least one relational database and one or more user interfaces;

wherein the method is performed by at least one processing device comprising a processor coupled to a memory.

2. The computer-implemented method of claim 1, wherein processing the at least a portion of the obtained data comprises programmatically transforming unstructured data obtained from the at least one automated call distribution system into third order normal form data.

3. The computer-implemented method of claim 1, wherein processing the at least a portion of the obtained data comprises one or more using primary key-foreign key relationships coupled with cascade referential integrity.

4. The computer-implemented method of claim 1, wherein the at least one common data model comprises a standard taxonomy with one or more entity-relationship classifications between components pertaining to call flow management.

5. The computer-implemented method of claim 4, wherein the components pertaining to call flow management comprise at least two of one or more switches, one or more agents, one or more vectors, one or more vector directory numbers, one or more hunt groups, one or more agent skills, and one or more announcements.

6. The computer-implemented method of claim 1, wherein performing the at least one automated action comprises generating, and outputting to the at least one automated call distribution systems, one or more call flows.

7. The computer-implemented method of claim 1, wherein performing the at least one automated action comprises enabling at least one user to carry out one or more actions across multiple call flows associated with the at least one automated call distribution system, wherein the one or more actions comprise at least one of a browse operation, a read, an edit operation, an add operation, and a delete operation.

8. The computer-implemented method of claim 1, wherein the one or more user interfaces comprise at least one user interface configured based at least in part on a model-view-controller design pattern, and wherein the at least one user interface provides one or more multi-level views encompassing multiple components of the at least one automated call distribution system.

9. The computer-implemented method of claim 1, further comprising:

implementing an interface to at least one messaging-oriented middleware associated with the at least one automated call distribution system.

10. A non-transitory processor-readable storage medium having stored therein program code of one or more software programs, wherein the program code when executed by at least one processing device causes the at least one processing device:

to obtain data from at least one automated call distribution system;

to process at least a portion of the obtained data using at least one common data model pertaining to call flow management;

to configure at least one relational database using at least a portion of the processed data; and to perform at least one automated action related to call flow management associated with the at least one automated call distribution system using the at least one relational database and one or more user interfaces.

11. The non-transitory processor-readable storage medium of claim 10, wherein processing the at least a portion of the obtained data comprises programmatically transforming unstructured data obtained from the at least one automated call distribution system into third order normal form data.

12. The non-transitory processor-readable storage medium of claim 10, wherein processing the at least a portion of the obtained data comprises one or more using primary key-foreign key relationships coupled with cascade referential integrity.

13. The non-transitory processor-readable storage medium of claim 10, wherein the at least one common data model comprises a standard taxonomy with one or more entity-relationship classifications between components pertaining to call flow management.

14. The non-transitory processor-readable storage medium of claim 10, wherein performing the at least one automated action comprises enabling at least one user to carry out one or more actions across multiple call flows associated with the at least one automated call distribution system, wherein the one or more actions comprise at least one of a browse operation, a read, an edit operation, an add operation, and a delete operation.

15. The non-transitory processor-readable storage medium of claim 10, wherein the one or more user interfaces comprise at least one user interface configured based at least in part on a model-view-controller design pattern, and wherein the at least one user interface provides one or more multi-level views encompassing multiple components of the at least one automated call distribution system.

16. An apparatus comprising:

at least one processing device comprising a processor coupled to a memory;

the at least one processing device being configured:

to obtain data from at least one automated call distribution system;

to process at least a portion of the obtained data using at least one common data model pertaining to call flow management;

to configure at least one relational database using at least a portion of the processed data; and to perform at least one automated action related to call flow management associated with the at least one automated call distribution system using the at least one relational database and one or more user interfaces.

17. The apparatus of claim 16, wherein processing the at least a portion of the obtained data comprises programmatically transforming unstructured data obtained from the at least one automated call distribution system into third order normal form data.

18. The apparatus of claim 16, wherein processing the at least a portion of the obtained data comprises one or more using primary key-foreign key relationships coupled with cascade referential integrity.

19. The apparatus of claim 16, wherein the at least one common data model comprises a standard taxonomy with one or more entity-relationship classifications between components pertaining to call flow management.

20. The apparatus of claim 16, wherein performing the at least one automated action comprises enabling at least one user to carry out one or more actions across multiple call flows associated with the at least one automated call distribution system, wherein the one or more actions comprise at least one of a browse operation, a read, an edit operation, an add operation, and a delete operation.

\* \* \* \* \*

UNITED STATES PATENT AND TRADEMARK OFFICE
CERTIFICATE OF CORRECTION

| | |
|---|---|
| PATENT NO. | : 11,438,459 B2 |
| APPLICATION NO. | : 17/126291 |
| DATED | : September 6, 2022 |
| INVENTOR(S) | : Nirmala D'Souza et al. |

It is certified that error appears in the above-identified patent and that said Letters Patent is hereby corrected as shown below:

In the Claims

In Claim 3, Column 13, Line 15, replace "comprises one or more using primary key-foreign key" with -- comprises using one or more primary key-foreign key --.

In Claim 12, Column 14, Lines 9-10, replace "comprises one or more using primary key-foreign key" with -- comprises using one or more primary key-foreign key --.

In Claim 18, Column 14, Lines 56-57, replace "comprises one or more using primary key-foreign key" with -- comprises using one or more primary key-foreign key --.

Signed and Sealed this
Eighth Day of August, 2023

Katherine Kelly Vidal

Katherine Kelly Vidal
*Director of the United States Patent and Trademark Office*